US006750782B1

(12) United States Patent
Byun

(10) Patent No.: US 6,750,782 B1
(45) **Date of Patent: *Jun. 15, 2004**

(54) REMOTE CONTROL SYSTEM OPERATING WITH USER DEFINED CODE SIGNAL AND A METHOD OF CONTROLLING THE SAME

(75) Inventor: Jung-Gun Byun, Suwon (KR)

(73) Assignee: Samsung Electronics Co., Ltd., Suwon-si (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,996

(22) Filed: Dec. 22, 1997

(30) Foreign Application Priority Data

Dec. 21, 1996 (KR) ........................................... 96/69849

(51) Int. Cl.[7] .......................... H04Q 1/00; G05B 19/00

(52) U.S. Cl. ............................... 340/825.72; 340/5.64; 340/5.23; 340/5.21

(58) Field of Search ....................... 340/825.72, 825.56, 340/825.69, 825.22, 825.31, 5.64, 5.23, 5.21

(56) References Cited

U.S. PATENT DOCUMENTS

| | | | | |
|---|---|---|---|---|
| 4,005,428 A | | 1/1977 | Graham | |
| 4,352,992 A | | 10/1982 | Buennagel et al. | |
| 4,412,218 A | | 10/1983 | Niitsu | |
| 4,786,900 A | * | 11/1988 | Karasawa et al. | 340/825.31 |
| 4,816,635 A | | 3/1989 | Edamura | |
| 5,065,235 A | | 11/1991 | Iijima | |
| 5,097,260 A | | 3/1992 | Ahn | |
| 5,146,215 A | * | 9/1992 | Drori | 340/825.69 |
| 5,159,329 A | | 10/1992 | Lindmayer et al. | |
| 5,365,154 A | | 11/1994 | Schneider et al. | |
| 5,414,761 A | | 5/1995 | Darbee | |
| 5,473,318 A | | 12/1995 | Martel | |
| RE35,364 E | | 10/1996 | Heitschel et al. | |
| 5,565,857 A | | 10/1996 | Lee | |
| 5,576,701 A | | 11/1996 | Heitschel et al. | |
| 5,598,475 A | | 1/1997 | Soenen et al. | |
| 5,608,389 A | | 3/1997 | Matsuzawa | |
| 5,864,297 A | * | 1/1999 | Sollestre et al. | 340/825.31 |

* cited by examiner

*Primary Examiner*—Brian Zimmerman
(74) *Attorney, Agent, or Firm*—Robert E. Bushnell, Esq.

(57) ABSTRACT

A remote control system exclusively controls an apparatus even when a plurality of the same type of apparatuses systems are located in a given place. A user defined code is designated by the user with respect to a transmitter and a receiver of the remote control system. The transmitter generates a remote control signal that includes the user defined code and a scan code in response to a control key input. The counterpart receiver responds to the coded signal received from the transmitter only when the user defined code received is identical with the one set in the receiver. The method of setting a user defined code in the transmitter includes the steps of determining whether a key input corresponds to the user defined code setting key designated in the key pad of the transmitter, setting a user defined code in response to another key input by the user, and storing the user defined code set by the user in a memory installed in the transmitter.

8 Claims, 5 Drawing Sheets

REMOTE CONTROL SYSTEM OPERATING WITH USER DEFINED CODE SIGNAL AND A METHOD OF CONTROLLING THE SAME

CLAIM OF PRIORITY

This application makes reference to, incorporates the same herein, and claims all benefits accruing under 35 U.S.C. §119 from an application for A REMOTE CONTROL SYSTEM OPERATING WITH USER DEFINED CODE SIGNAL AND THE METHOD OF CONTROLLING THE SAME earlier filed in the Korean Industrial Property Office on the 21$^{st}$ of Dec. 1996 and there duly assigned Ser. No. 69849/1996.

BACKGROUND OF THE INVENTION

1. Technical Field

The present invention relates to remote control systems and, more particularly, to a remote control system and method for controlling an apparatus exclusively among a plurality of the same types of apparatus at a given location.

2. Related Art

Remote control systems include a remote controller ("remocon") and an apparatus to be controlled. The remote control system has been widely used in electric home appliances and is usually implemented as a wireless control system for the purposes of simplicity. The remocon has a key pad and a transmitter for generating a remote control signal in response to a key input of the user. The control signal is converted into a coded signal and sent to a receiver provided in the controlled apparatus. Upon receiving the control signal, the receiver discriminates the coded signal and outputs a predetermined control signal for desired operation of the apparatus. A microprocessor is provided in the receiver to perform the remote control operation.

Coding of the control signal is usually determined by the manufacturer in accordance with the type of apparatus being controlled. Typically, the coding of a control signal generated by a remocon which controls a given apparatus is the same as the control signal generated by other remocons controlling the same type of apparatus. Thus, as explained in more detail below, a problem arises when a plurality of the same type of apparatus having the same remote control system are colocated. Therefore, there has been a need to develop a remote control system and method which can distinguish an apparatus of a given type from another apparatus of the same type when a plurality of the same type remote control systems are colocated.

The following patents are considered to be representative of the prior art relative to the present invention, and are burdened by the disadvantage discussed above: U.S. Pat. No. 4,412,218 to Niitsu, entitled Remote Control Signal Transmitter Capable Of setting Custom Codes Individually Alloted To A Plurality Of Controlled Instruments, U.S. Pat. No. 5,365,154 to Schneider et al., entitled Appliance Control System And Method, U.S. Pat. No. 5,608,389 to Matsuzawa, entitled Remote Control Devices For Electronic Appliances, U.S. Pat. No. 4,005,428 to Graham, entitled Secure Remote Control Communication Systems, U.S. Pat. No. 5,159,329 to Lindmayer et al., entitled Method For Safeguarding Code Words Of A remote Control System, U.S. Pat. No. Re. 35,364 to Heitschel et al., entitled Coding System For Multiple Transmitters And A Single Receiver For A Garage Door Opener, U.S. Pat. No. 5,598,475 to Soenen, et al., entitled Rolling Code Identification Scheme For Remote Control Applications, U.S. Pat. No. 4,352,992 to Buennagel et al., entitled Apparatus For Addressably Controlling Remote Units, U.S. Pat. No. 4,816,635 to Edamura, entitled Microwave Oven With Remote Controller, U.S. Pat. No. 5,414,761 to Darbee, entitled Remote Control System, U.S. Pat. No. 5,065,235 to Iijima, entitled CATV Terminal Unit Including Memory For Storing Remote Control Codes Relating To AN External Apparatus, U.S. Pat. No. 5,097,260 to Ahn, entitled Operation Control Circuit With Secret Code Comparing Means For Remote Control Keypad, U.S. Pat. No. 5,473,318 to Martel, entitled Secure Remote Control System With Receiver Controlled To Add And Delete Identity Codes, U.S. Pat. No. 5,565,857 to Lee, entitled Electronic Identification System Having Remote Automatic Response Capability And Automatic Identification Method Thereof, and U.S. Pat. No. 5,576,701 to Heitschel et al., entitled Remote Actuating Apparatus Comprising Keypad Controlled Transmitter.

SUMMARY OF THE INVENTION

It is, therefore, an object of the invention to provide a remote control system and method for controlling an apparatus exclusively among a plurality of the same type of apparatus located in a given place.

In accordance with the present invention, the above object is achieved by a remote control system in which an apparatus can be controlled exclusively by using a user defined code signal. The remote control system comprises: a transmitter having a user defined code setting function and generating a coded signal that includes the user defined code and a scan code; and a receiver incorporated into an apparatus and having the user defined code setting function, the receiver responding to the coded signal received from the transmitter by comparing the received user defined code with a user defined code set in the receiver and carrying out the control function when the comparison results in a match.

In accordance with another aspect of the present invention, there is provided a method for controlling a remote control system having a transmitter and a receiver. The method comprises the steps of: setting a user defined code of the same value in the transmitter and receiver; generating, in response to a control key input, a remote control signal including the user defined code as well as the control code, and transmitting the remote control signal to the receiver; comparing the user defined code included in the remote control signal with the code stored in the receiver; and performing a control operation corresponding to the remote control signal when the comparison is found to be identical.

Further, the step of setting a user defined code in the transmitter comprises the steps of: determining whether a key input corresponds to the user defined code setting key designated in the key pad of a transmitter; setting a user defined code in response to another key input by the user if the key input is the user defined code setting key; and storing the user defined code set by the user in a memory installed in the transmitter.

Similarly, the step of setting a user defined code in the receiver comprises the steps of: determining whether a key input signal corresponds to the user defined code setting key; setting a user defined code in response to a subsequent key input signal if the key input signal is the user defined code setting key; and storing the inputted user defined code in a memory installed in the receiver.

According to the invention, independent control is possible among the same type remote control systems, since each remote control system is capable of setting a different user defined code. Thus, it is possible to establish an exclusive signal transmission path between the transmitter and receiver of a remote control system, and each remote control system is distinguishable from others of the same type.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
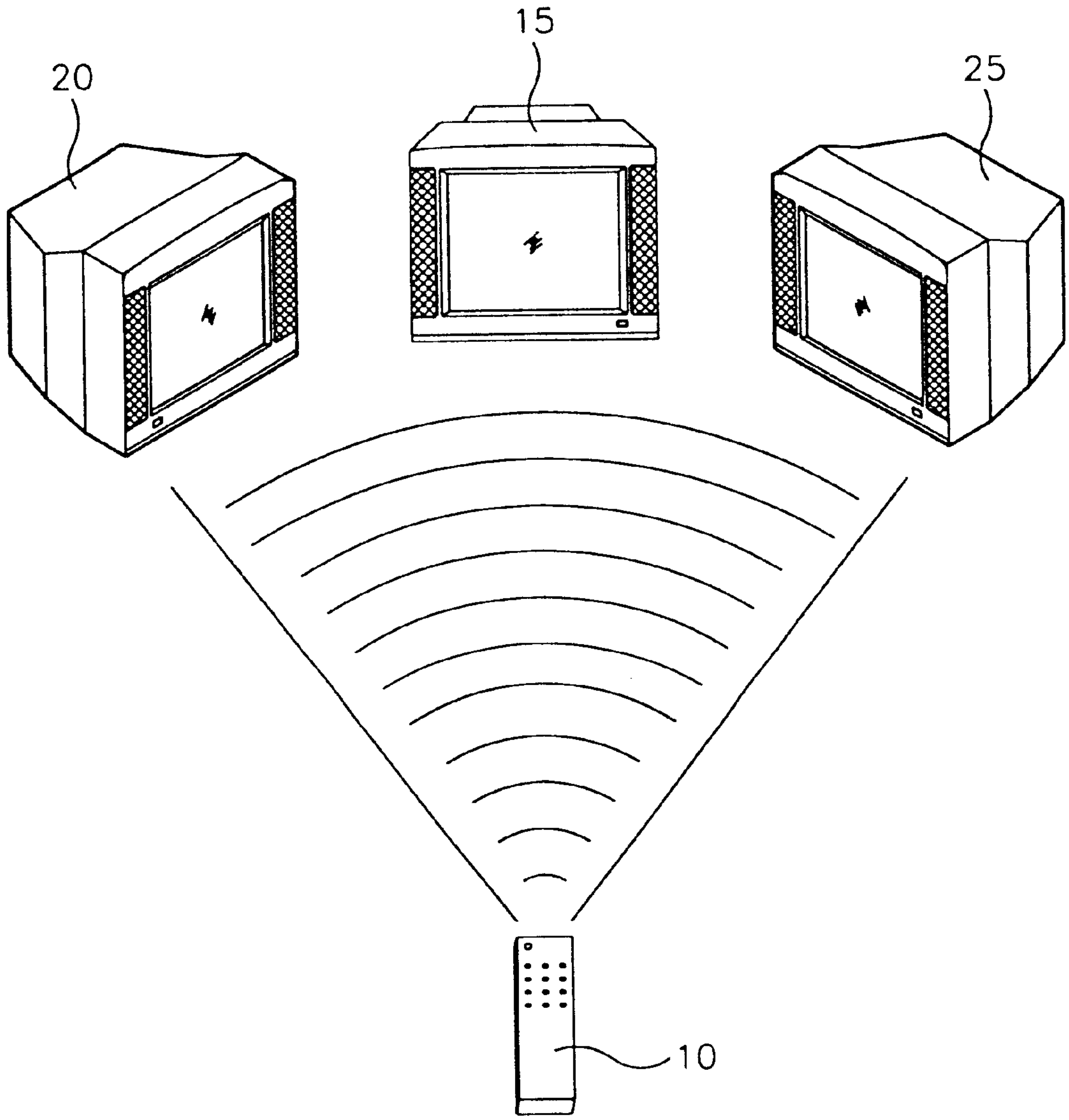
FIG. 1 illustrates usage of a remote control system in which a plurality of the same type remote control systems are located in one place.
Figure 2:
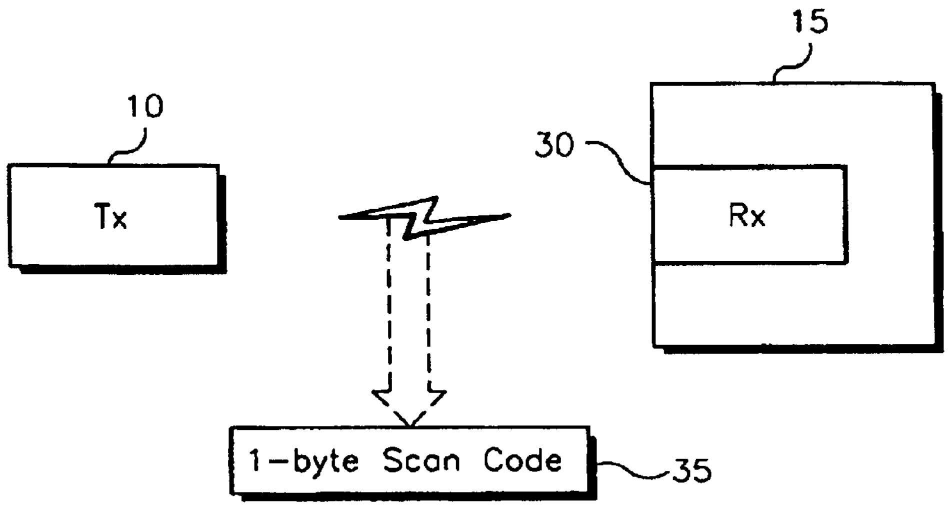
FIG. 2 is a schematic diagram showing a signal transmission system used in a remote control system.

An arrangement in which several televisions are colocated is shown in FIG. 1, and a remote control system is schematically shown in FIG. 2. In FIG. 2, a remote control signal is transmitted from a remocon 10 to a receiver 30 incorporated into an apparatus 15. The remote control system uses the above-mentioned coded signal transmission method between transmitter and receiver. The remote control signal commonly includes a 1-byte scan code.

However, in such a remote control system, a problem arises when a plurality of the same type of apparatus having the same remote control system are used in one place. For example, as shown in FIG. 1, if television sets 15, 20, and 25 having the same remote control system are placed near to each other in a room, control operation of the remocon 10 causes simultaneous operation of all television sets, and it is impossible to control each apparatus independently. Further, unintentional operation of one television set may occur when the remote control system for another television located nearby is operated. Thus, there is need for a remote control system which can distinguish one apparatus from another when a plurality of the same type remote control systems are located in the same place.

Figure 3:
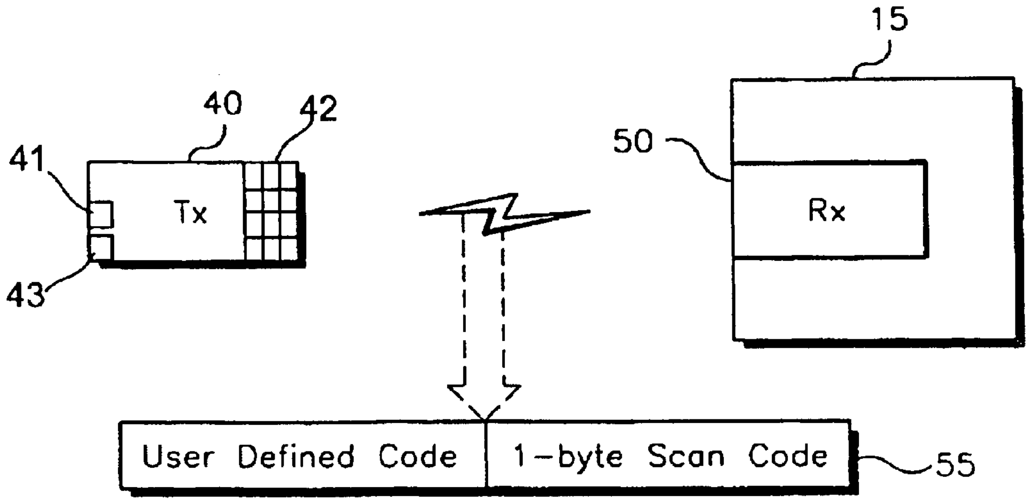
FIG. 3 is a schematic diagram showing a signal transmission system of a remote control system in accordance with the present invention.
Figure 4:
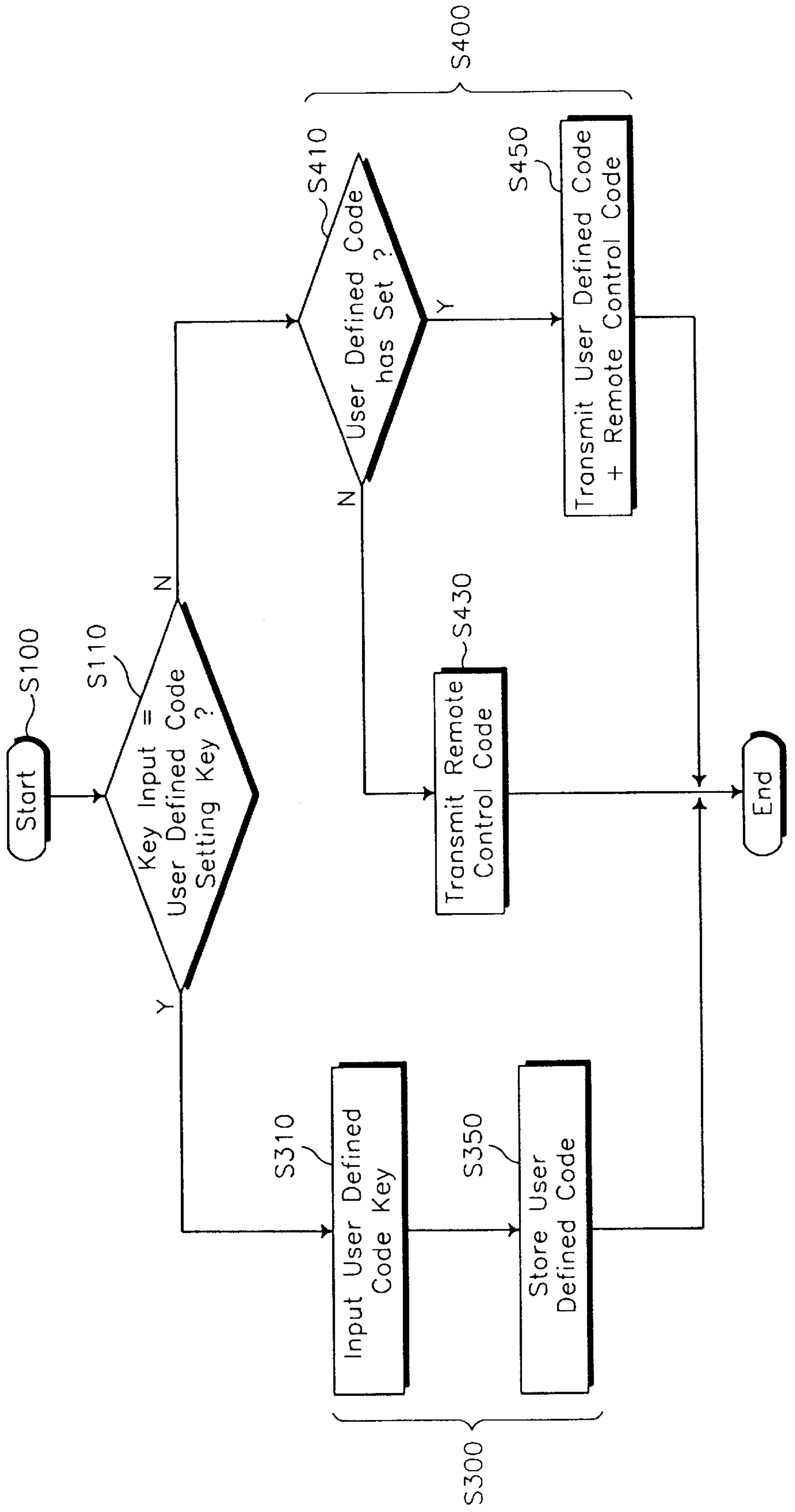
FIG. 4 is a flow chart showing a user defined code setting method used in the transmitter of the remote control system in accordance with the invention.

Referring to FIG. 3, there is shown a signal transmission system used in a remote control system in accordance with the present invention. The remote control system includes a transmitter 40 incorporated into a remocon, and a receiver 50 incorporated into the corresponding apparatus 15 to be controlled. The transmitter 40 has a user defined code setting function and transmits a remote control signal 55, including a user defined code. The receiver 50 also has a user defined code setting function to receive the remote control signal 55. The remote control signal 55 consists of, for example, a user defined code and a 1-byte scan code. This means that the user defined code is added to the conventional scan code, and the scan code is not limited to one byte.

The setting of a user defined code is performed in the transmitter 40 and counterpart receiver 50 through operation of one or more function keys of the remocon by the user. For example, the user selects the user defined code setting key 41 and presses a combination of numeric keys 42. With this, the user defined code is assigned to both transmitter 40 and receiver 50. Preferably, the transmitter 40 has a read only memory (ROM) table to generate a user defined code in response to a remote control key input of the user.

After setting of the user defined code in the transmitter 40 and receiver 50, there is established an exclusive signal transmission path that is distinguishable from other remote control systems of the same kind. The receiver 50 responds to the remote control signal transmitted by the transmitter 40 only if the received remote control signal is found to have the user defined code, and it is identical with the one that is stored in the receiver 50.

The user defined code setting method used in the transmitter 40 will be described in detail with reference to FIG. 3. If a user operates a key of the remocon, a determination is made as to whether the key input corresponds to the user defined code setting key 41 (step 110). If it is found that the key input corresponds to the user defined code setting key 41, a user defined code input procedure is performed (step 300) by inputting one or more numeric keys 42 designated by the user (step 310). The inputted user defined code is stored in a memory installed in the remocon (step 350).

If it is found that the key input corresponds to a remote control key 43, other than the user defined code setting key 41 (step 110), a remote control signal generation procedure is performed (step 400). First, a check is made (step 410) as to whether a user defined code has been set in the transmitter 40. If a user defined code has been set in the transmitter, a remote control signal which has a user defined code plus the scan code corresponding to the key input is generated and transmitted to the receiver (step 450). However, if a user defined code has not been set in the transmitter, a remote control signal which has a 1-byte scan code corresponding to the key input is generated and transmitted to the receiver (step 430).

With this procedure, once a user defined code has been set in a transmitter, the remote control signal generated in the transmitter is distinguishable from signals from other transmitters in the same remocon system.

Figure 5:
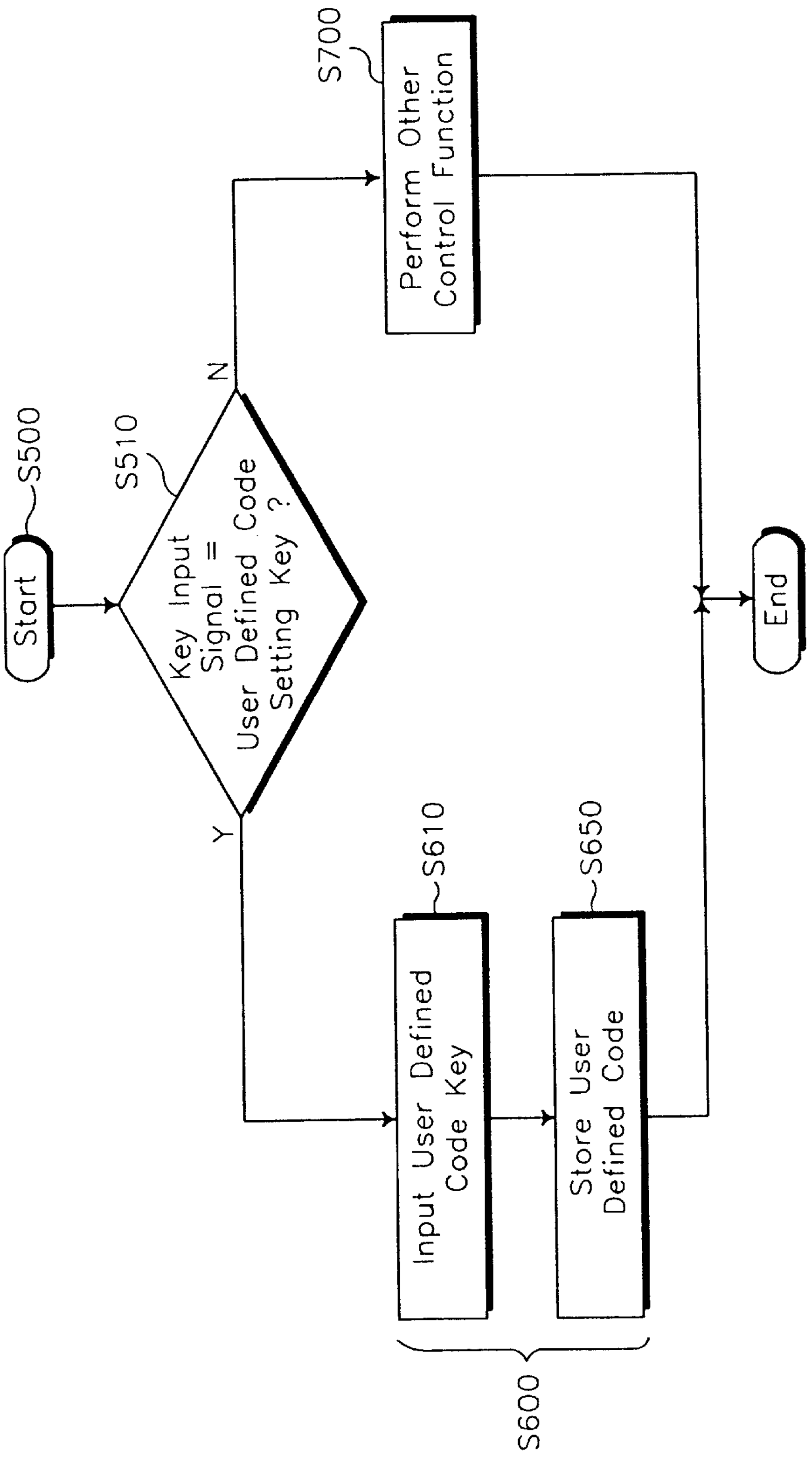
FIG. 5 is a flow chart showing a user defined code setting method used in the receiver of the remote control system in accordance with the invention.

Next, the user defined code setting method used in the counterpart receiver will be described with reference to FIG. 5. If a remote control signal is received at the receiver 50, a determination is made (step 510) as to whether the control signal corresponds to a key input of the user defined code setting key. If it is found that the key input corresponds to the user defined code setting key, overall step 600 is carried out and the user defined code is received (step 610). Then, the received user defined code is stored in memory provided in the receiver 50 (step 650). However, if the received remote control signal does not correspond to a key input for setting the user defined code, another control function is performed (step 700).

Figure 6:
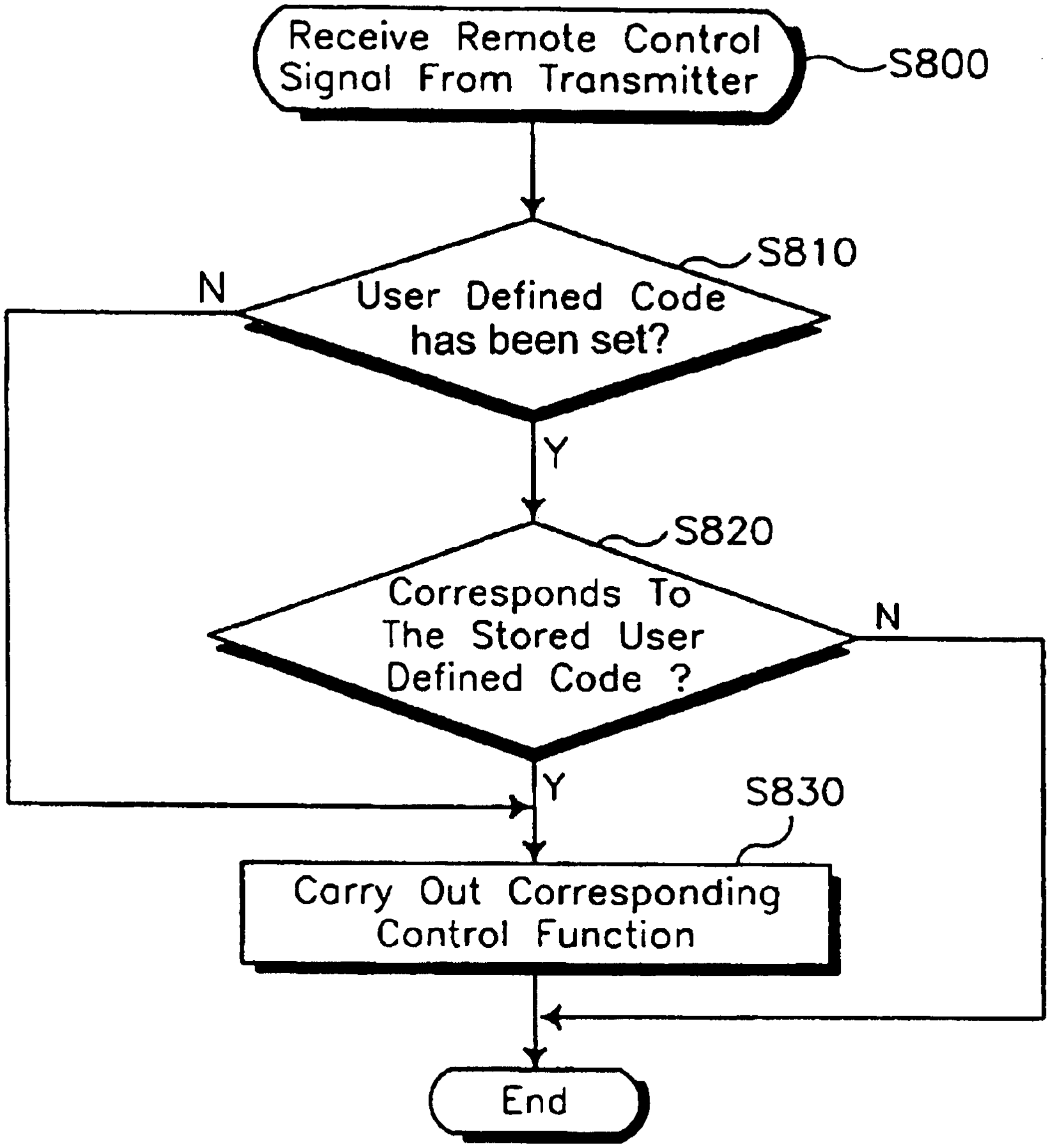
FIG. 6 is a flow chart showing a control method performed in the receiver of the remote control system in accordance with the present invention.

Further, the receiver 50 performs control functions in response to the received remote control signal as shown in FIG. 6. If the receiver 50 receives a remote control signal (step 800), a determination is made as to whether a user defined code has been set in the receiver 50 (step 810). If a user defined code is set in the receiver 50, a check is made as to whether the user defined code included in the remote control signal is identical to the one stored in the receiver 50 (step 820).

If the received user defined code and stored user defined code match, the corresponding control function for the apparatus is performed (step 830). However, if the codes do not match, the control function will not be carried out. Meanwhile, if it is found (step 810) that a user defined code has not been set in the receiver 50, the control function for the apparatus is performed regardless of the absence of a user defined code in the remote control signal (step 830).

As is apparent from the foregoing, the remote control system of the present invention provides a control method which is independent for each remote control system of the same type since each remote control system is capable of setting a different user defined code. Thus, it is possible to establish an exclusive signal transmission path between the transmitter and receiver of a remote control system and that is distinguishable from other remote control systems of the same kind. Therefore, it is possible to prevent interference between the same type of remote control systems, especially when they are located in the same place.

While the invention has been described in terms of an exemplary embodiment, it is contemplated that it may be practiced as outlined above with modifications within the spirit and scope of the appended claims.

What is claimed is:

1. A remote control system for controlling an apparatus exclusively among a plurality of a same type of apparatuses at a given location, said system comprising:

a transmitter including a keypad having a code setting key, a control function key and a plurality of data input keys, said transmitter being responsive to user operation of said code setting key for establishing a user defined code setting mode in which said transmitter is responsive to user entry into the transmitter by means of said data input keys of a user defined code for setting and storing the user defined code in the transmitter and for transmitting the user defined code, and said transmitter being responsive to user operation of said control function key for establishing a control function mode in which said transmitter is responsive to user entry into the transmitter by means of said data input keys of a control function for transmitting a coded signal that includes the user defined code and a scan code representing the control function entered by the user; and a receiver incorporated into the apparatus and having a user defined code setting mode responsive to reception of the user defined code transmitted by the transmitter for setting and storing the user defined code in the receiver, said receiver receiving and responding to the coded signal generated by the transmitter;

wherein, once the user defined code is stored in both the transmitter and receiver, the received user defined code in the received coded signal is compared to the user defined code set in the receiver, and the control function is carried out only when the received user defined code matches the user defined code stored in the receiver.

2. The system of claim 1, wherein said transmitter further comprises:

means for determining whether a key input initiated by the user corresponds to the code setting key in said key pad; and means for setting the user defined code in response to a subsequent key input by the user when the key input corresponds to the code setting key.

3. The system of claim 1, wherein said receiver comprises:

means for determining whether a key input initiated by the user corresponds to a code setting key;

means for setting the user defined code in response to a subsequent key input signal when the key input corresponds to the code setting key; and means for storing the user defined code set by said setting means.

4. A method for controlling a remote control system having a transmitter and a receiver, said method comprising the steps of:

providing said transmitter with a code setting key, data input keys and a control key;

activating a user defined code setting mode in the transmitter when the user operates the code setting key in the transmitter;

receiving a user defined code entered into the transmitter by a user operating the data input keys;

transmitting the user defined code to the receiver, thereby activating a user defined code setting mode in the receiver;

setting the user defined code in both the transmitter and the receiver;

generating, in response to operation of the control key by the user, a remote control signal including the user defined code and a control code;

transmitting the remote control signal to the receiver;

comparing the user defined code included in the remote control signal with the user defined code set in the receiver; and performing a control operation corresponding to the remote control signal when the comparing step results in a match.

5. The method of claim 4, further comprising the step of:

determining whether the user defined code has been set in the receiver when the receiver receives the remote control signal from the transmitter.

6. A remote control system for controlling an apparatus exclusively among a plurality of a same type of apparatuses at a given location, said system comprising:

a transmitter having a code setting key, a control function key and a plurality of data input keys, said transmitter being responsive to user operation of said code setting key for establishing a user defined code setting mode in which said transmitter is responsive to entry into the transmitter by a user of a user defined code for setting and storing the user defined code in the transmitter and for transmitting the user defined code, and said transmitter being responsive to user operation of said control function key for establishing a control function mode in which said transmitter is responsive to entry into the transmitter by the user of a control function for transmitting a coded signal that includes the user defined code and a scan code representing the control function entered by the user; and a receiver for receiving the coded signal generated by said transmitter;

wherein said transmitter comprises:

a keypad which includes the code setting key, the control function key and the data input keys;

means for determining whether a key input corresponds to the code setting key in the keypad;

means for setting the user defined code in the transmitter in response to another key input by the user when the key input corresponds to the code setting key; and means for storing the user defined code set by the setting means;

wherein, once the user defined code is stored in the transmitter, the user defined code is set in the receiver, and the user defined code included in the received coded signal is compared to the user defined code set in the receiver; and wherein the control function is carried out only when the user defined code included in the received coded signal matches the user defined code set in the receiver.

7. A remote control system for controlling an apparatus exclusively among a plurality of a same type of apparatuses at a given location, said system comprising:

a transmitter having a code setting key, a control function key and a plurality of data input keys, said transmitter being responsive to user operation of said code setting key for establishing a user defined code setting mode in which said transmitter is responsive to entry into the transmitter by means of said data input keys of a user defined code for setting and storing the user defined code in the transmitter and for transmitting the user defined code, and said transmitter being responsive to user operation of said control function key for establishing a control function mode in which said transmitter is responsive to user entry into the transmitter by means of said data input keys of a control function for transmitting a coded signal that includes a user entered code; and a receiver incorporated into the apparatus and having a user defined code setting mode responsive to reception of the coded signal that includes the user defined code as transmitted by the transmitter for storing the user defined code in the receiver, said receiver receiving and responding to the coded signal transmitted by the transmitter;

wherein said receiver comprises:

means for determining whether a key input corresponds to the code setting key;

means for setting the user defined code in the receiver in response to a subsequent key input when the key input corresponds to the code setting key; and means for storing the user defined code set by said setting means;

wherein the control function is carried out only when the received user entered code matches the user defined code stored in the receiver.

8. The system of claim 7, wherein, once the user defined code is stored in both the transmitter and the receiver, the user entered code in the received coded signal is compared to the user defined code stored in the receiver.

* * * * *